United States Patent [19]

Movick

[11] Patent Number: 4,928,516
[45] Date of Patent: May 29, 1990

[54] APPARATUS FOR DETERMINING THE CENTER OF GRAVITY OF A SPHERICAL BALL

[76] Inventor: Nyle O. Movick, 4600 Macky Way, Boulder, Colo. 80303

[21] Appl. No.: 162,075

[22] Filed: Feb. 29, 1988

[51] Int. Cl.$^5$ ............................................. G01M 1/12
[52] U.S. Cl. ......................................................... 73/65
[58] Field of Search ................. 73/65, 461; 273/59 B, 273/59 R; 426/252, 251; 211/14; 118/30

[56] References Cited

U.S. PATENT DOCUMENTS

| | | | |
|---|---|---|---|
| 1,250,888 | 12/1917 | Johnson | 211/14 |
| 4,111,038 | 9/1978 | Olson et al. | 73/65 |
| 4,546,644 | 10/1985 | Beny et al. | 73/65 |

OTHER PUBLICATIONS

"Manufacture of Bowling Balls at Stowe-Woodward", Rubber Age, Aug. 1954, pp. 688-689.
Carl Soto, "Aid for Putting Has Some Merit", The Arizona Republic, Oct. 31, 1976.
Johnny Janes, "Tee to Green", The San Antonio Light, Nov. 21, 1976.
Ray Crawford, "Tomlinson Defending Title", Miami Herald.

Primary Examiner—Charles A. Ruehl

[57] ABSTRACT

This invention is an apparatus for determining and marking an axis of an unbalanced spherical ball which axis contains its geometric center as well as its center of gravity. This axis is determined by using "contained floating" apparatus wherein a ball to be tested is placed in a closely fitted and especially designed cup and the cup containing the ball to be tested is placed in a container of a suitable liquid in which the ball floats. One example would be an ordinary golf ball placed in a closely fitted, especially designed cup and the cup containing the golf ball is lowered into an open container filled to a suitable level with FREON 113. In a relatively short period of time, heavy portions of the ball to be tested will rotate by gravity to its bottom-most position and, hence, the desired axis is vertical and thereby determined and can be marked by any convenient marking method.

2 Claims, 2 Drawing Sheets

APPARATUS FOR DETERMINING THE CENTER OF GRAVITY OF A SPHERICAL BALL

BACKGROUND OF THE INVENTION

The present invention relates to apparatus for determining an axis of a spherical ball which axis includes its geometric center and its center of gravity.

The fact that the weight center is not located exactly at the geometric center of a spherical ball is a widely known phenomenon.

Various studies of this unbalanced condition have been made. In the case of a golf ball, this phenomenon is described in detail by Olson et al in U.S. Pat. No. 4,111,038. Their findings showed this unbalanced condition to cause a golf ball to possibly veer undesirably when being putted. Further recited in their invention is a method and apparatus for locating an axis in an unbalanced golf ball containing both its geometric center as well as its center of gravity and a method for indelibly marking the uppermost point of this axis. This finding allowed for a certain control over this undesirable veering when a golf ball is being putted.

Their method for locating this axis involved freely floating a golf ball in water whose density had been enhanced by using magnesium sulfate and whose surface tension had been modified using propylene glycol.

Some of the FREONS currently being produced have densities greater than that of an ordinary golf ball. As an example, FREON 113 has a density of approximately 0.910 ounces per cubic inch at room temperature, while FREON 11 has a density of approximately 0.860 ounces per cubic inch at room temperature. This compares with an ordinary golf ball that has a density of approximately 0.650 ounces per cubic inch. Hence, it can be seen that an ordinary golf ball will float in both FREON 113 and FREON 11. Additionally, FREONS have the further advantage of having less surface tension and do not ordinarily require surface tension modifiers such as is used in the Olson, et al method described above.

Present invention does not utilize densifying agents and a water mix to cause a ball to float, but rather employs liquids of sufficient density such that a chosen ball will ordinarily float when placed in such liquids. Further, the chosen ball is contained in a closely fitted and especially designed cup when being floated such that fluid friction causes the ball to come to rest in a much shorter period of time than it would if freely floated. More specifically, a container of adequate size is filled to a predetermined level with a liquid such as FREON 113 or FREON 11 such that when the closely fitted and especially designed cup containing a ball such as a golf ball is lowered into the container filled as above with one of the chosen liquids to a depth such that the ball floats, the heavy portions of the ball will rotate by gravity to the lower-most position over time and the desired axis containing the balls' geometric center and its center of gravity will become vertical and hence, determined. Further, the clearance between the inner spherical diameter of the especially designed cup and the outer spherical diameter of the ball being tested is of primary importance. The inner spherical diameter of the especially designed cup should be just large enough such that the outer spherical diameter of the ball to be tested fits with sufficient clearance so the ball will rotate freely by gravity when floated, but close enough such that maximum fluid friction in the liquid trapped in the narrow gap remaining between the inner spherical diameter of the especially designed cup and the outer spherical diameter of the ball, is attained. In this manner, the heavy portion of the ball being tested will rotate by gravity to the bottom-most position in the desired least amount of time.

Additionally, this "contained floating" apparatus allows for raising the cup and the ball being tested from the chosen liquid without distrubing said balls' relative position while providing for a more convenient method of marking the upper-most point of said axis.

DETAILED DESCRIPTION OF THE INVENTION

Figure 2:
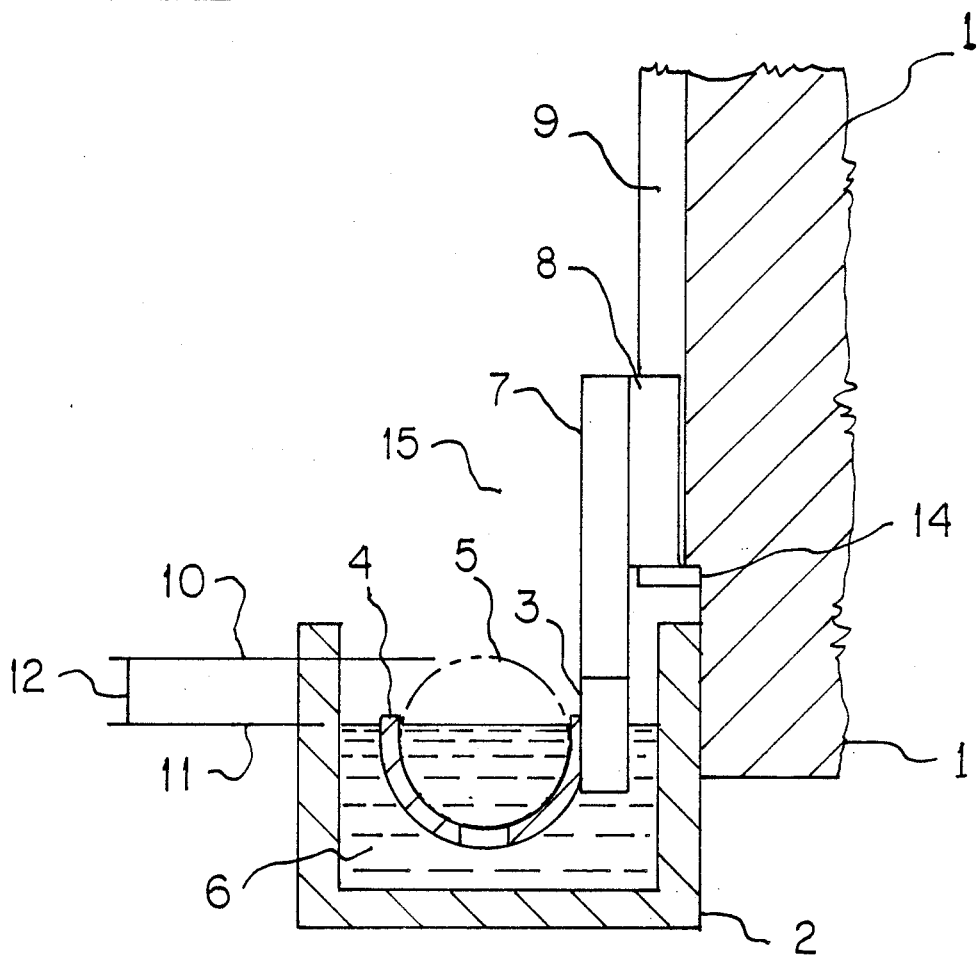
FIG. 2 is a sectional view of a "contained floating" apparatus for determining an axis of an unbalanced spherical ball.

A cross sectional view of new and improved apparatus for determining an axis of an unbalanced spherical ball is shown in FIG. 2. Apparatus generally comprising the following:

Numeral 5 is any unbalanced spherical ball placed in closely fitted especially designed spherical cup 4. Cup 4 is rigidly affixed to cross bar 3. Vertical riser 7 is rigidly affixed at the center point of cross bar 3. Affixed at the top of vertical riser 7 is guide wedge 8. Guide wedge 8 is closely but freely fitted into guide slot 9 formed in supporting structure 1. Hence, it can be seen that cup 4, cross bar 3, vertical riser 7, and guide wedge 8 form a rigid assembly 15 which can be raised and lowered in guide slot 9 by any convenient means. Lower stop 14 provides for positioning this assembly 15 at its lower-most point.

Container and Liquid

Container 2 is any substantial vessel of sufficient size to allow for insertion of assembly 15 and for containing predetermined liquid 6. Container 2 is rigidly affixed to support structure 1.

The level of liquid 6 can readily be adjusted through adjustment range 12 by adding or removing liquid 6 as required. Line 10 represents the uppermost level of liquid 6 while line 11 may represent the lowermost level of liquid 6 (line 11 varies depending on the chosen ball-/liquid combinations).

Especially Designed Spherical Cup

Figure 3:
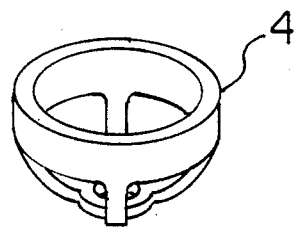
FIG. 3 is a perspective view of a preferred embodiment especially designed cup.

Especially designed spherical cup 4 is a substantially made cup whose inner spherical diameter is made to be closely fitted to the outside spherical diameter of said ball 5. As shown in FIG. 3, said cup 4 has materials removed such that sufficient rigidity remains while providing for adequate and rapid liquid contact with said ball 5 when said cup 4 containing said ball 5 be lowered into container 2 filled to a predetermined level with liquid 6.

Operation

Container 2 is filled to a predetermined level with liquid 6. Non-separable assembly 15 is raised to any appropriate height by any convenient means such that any spherical ball 5 to be tested may be easily placed in closely fitted especially designed cup 4. Non-separable assembly 15 is then lowered by any convenient means to lower stop 14 position such that spherical ball 5 be made to float. In a relatively short period of time, spherical ball 5 will rotate by gravity until its heavy portion is at the bottom-most position and hence, the axis which includes both the geometric center and the center of gravity will be vertical. Non-separable assembly 15 is then raised by any convenient means such that uppermost point of the desired axis of spherical ball 5 may be marked using any suitable marking means.

Persons skilled in such areas will recognize that an optimum liquid, an optimum liquid level and an optimum closely fitted especially designed cup configuration may be determined such that spherical ball 5 being tested will rotate such that its heavy portion is at the bottom-most position and thus the desired axis containing both its geometric center and its center of gravity will be vertical—this occuring in the desired least amount of time.

PREFERRED EMBODIMENT

Figure 1:
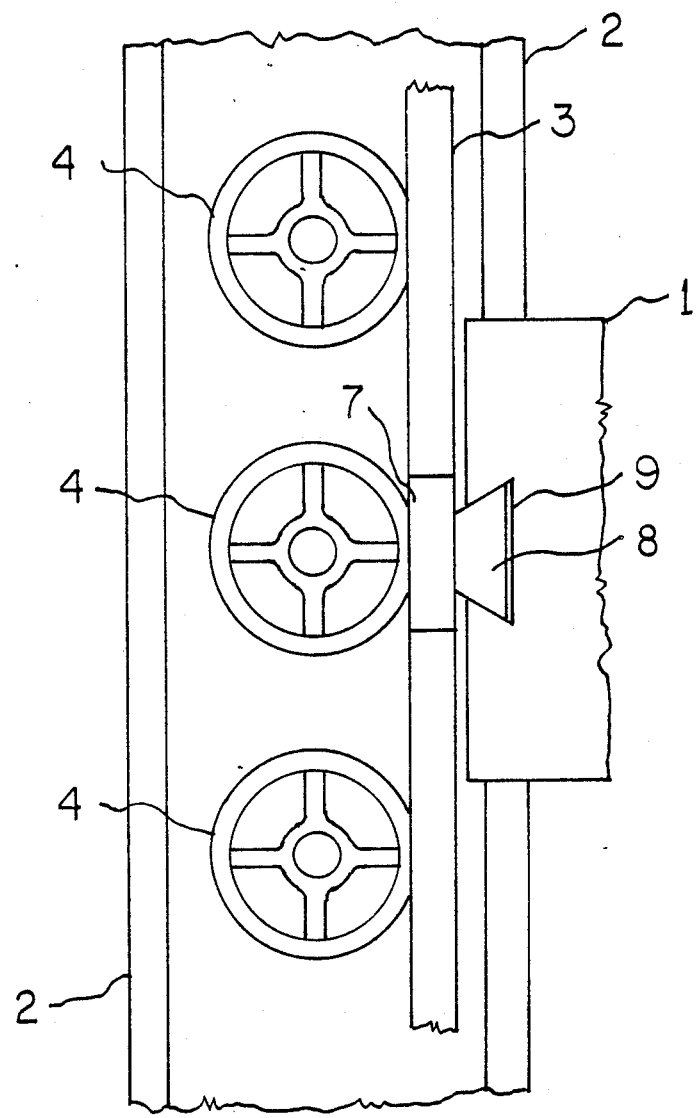
FIG. 1 is a plan view of the preferred embodiment of a "contained floating" apparatus for determining an axis of an unbalanced spherical ball.

FIG. 1 is a plan view of the preferred embodiment. Persons skilled in the art will recognize that any convenient number of cups 4 may be rigidly affixed to support bar 3 and container 2 be made to accomodate the chosen number of cups. A machine has been made with twelve (12) cups 4 affixed to support bar 3. It is intended that as few as one (1) and as many as thirty six (36) cups 4 may be affixed to support bar 3 in subsequent machines. The present preferred embodiment consists of three (3) cups 4 affixed to support bar 3.

Although the present invention has been described in terms of a particular embodiment, providing for locating an axis of an unbalanced spherical ball which axis includes its geometric center and its center of gravity employing a "contained floating" means, the system could also be used in other "contained floating" applications and it is anticipated that various changes, adaptations and modifications will be apparent to those skilled in the art, and it is intended that the appended claims be construed to cover such changes, adaptations and modifications except as limited by the prior art.

What is claimed is:

1. Apparatus for determining the axis of at least one unbalanced spherical ball, which axis includes the ball's geometric center and the ball's center of gravity, said apparatus comprising:

a container means for holding a predetermined liquid, at least one spherical cup for holding said spherical ball, said spherical cup fitting closely to the spherical ball yet allowing the ball to freely rotate when immersed in said predetermined liquid, a rigid assembly, to which is affixed said at least one spherical cup, support means to which the assembly is attached, said support means allowing the raising and lowering of said assembly and allowing the lowering and raising of said spherical ball into and out of said predetermined liquid.

2. Apparatus for determining the axis of at least one unbalanced spherical ball whose specific gravity is 1.1 to 7.9, which axis includes the ball's geometric center and the ball's center of gravity, said apparatus comprising:

a container means for holding a predetermined liquid, said predetermined liquid having a specific gravity of 1.2 to 14.0, at least one spherical cup for holding said spherical ball fitting closely to the spherical ball yet allowing the ball to freely rotate when immersed in said predetermined liquid, a rigid assembly, to which is affixed said at least one spherical cup, support means to which the assembly is attached, said support means allowing the raising and lowering of said assembly and allowing the lowering and raising of said spherical ball into and out of said predetermined liquid.

* * * * *